Nov. 23, 1926.  E. H. LINDEMAN  1,608,221
VEHICLE SPRING
Filed Nov. 22, 1924
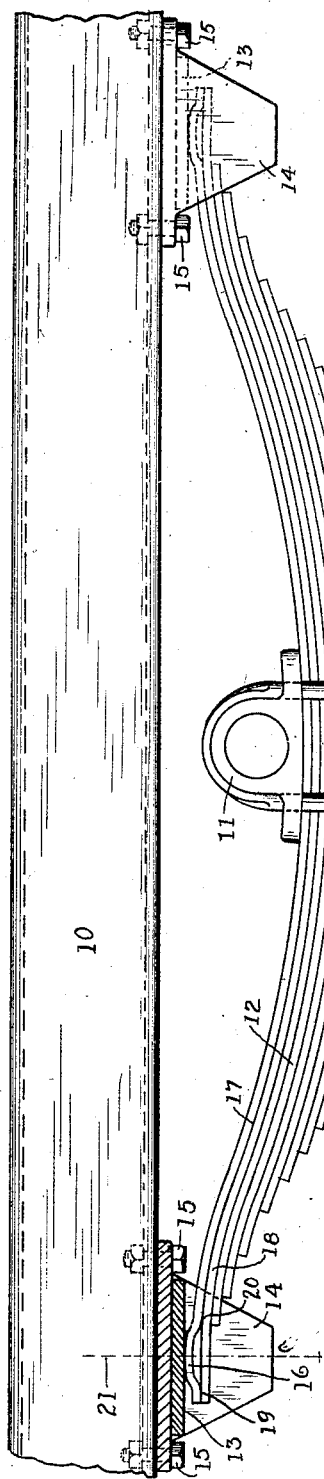
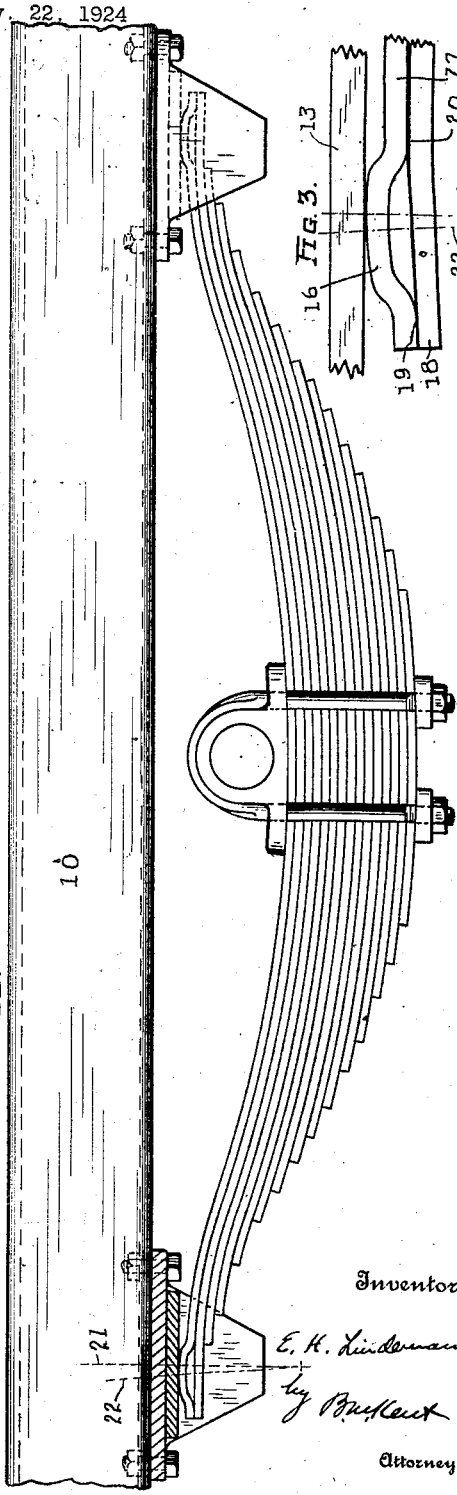
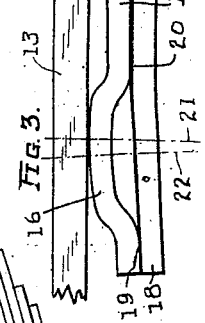
Inventor
E. H. Lindeman
Attorney Patented Nov. 23, 1926.

1,608,221

UNITED STATES PATENT OFFICE.

EDWARD H. LINDEMAN, OF CLEVELAND, ASSIGNOR TO THE EATON AXLE AND SPRING COMPANY, OF CLEVELAND, OHIO, A CORPORATION OF OHIO.

VEHICLE SPRING.

Application filed November 22, 1924. Serial No. 751,448.

This invention relates to vehicle springs and more particularly to spring for motor trucks.

The invention has reference to that type of springs in which the vehicle frame rests upon one or both ends of the spring without the use of a pivotal or shackle connection, one or both ends of the spring having a frictional contact with the frame or a bracket on the frame and sliding with reference thereto as the spring is lengthened or shortened by the deflection movements. The purpose of my improvement is to so shape the end of the main leaf of the spring which contacts with the frame that the point of contact will remain at substantially the same position on the frame throughout the normal range of deflection and to thereby maintain a substantially uniform rate of deflection. One objection to the prior constructions has been that the point of contact between the end of the spring and the frame moved toward the center of the spring as it deflected thereby greatly changing the rate of deflection and making the spring very stiff when in the fully loaded condition.

A further object of the invention is to provide a type of construction, embodying the improvements referred to, that will not materially increase the cost of manufacturing the spring.

Other objects of the invention and the features of novelty will be apparent from the following description, taken in connection with the accompanying drawings, of which:

Figure 1 is a side elevation of a spring embodying my invention, shown in connection with a fragment of the vehicle frame and axle, the spring being shown in the unloaded condition;

Fig. 2 is a similar view showing the spring in the loaded condition; and

Fig. 3 is an enlarged fragment of Fig. 2 showing diagrammatically the effect of my improvement.

Referring to the drawings, 10 indicates a fragment of one of the side members of the vehicle frame, 11 the axle and 12 a multiple leaf spring by which the frame is supported on the axle. In the form of the invention illustrated both ends of the spring 12 loosely engage with wear plates 13 on the brackets 14, which are secured to the frame member 10, by bolts 15, or in any other suitable manner. While I have shown both ends of the spring 12 as loosely engaging with the brackets 14 and not pivoted or shackled thereto, it will be understood that, in some cases, it will only be necessary to have one end of the spring thus arranged, the other end being pivoted or shackled to the frame, according to the usual practice.

In practising my invention, I provide a hump 16 at one or both ends of the main plate 17 of the spring 12. This hump 16 is arranged as close as practicable to the end of the spring and the main plate bears on the adjoining auxiliary plate 18, at the opposite ends of the hump, as indicated at the points 19 and 20. The hump 16 is directed away from the plate 18 and is preferably formed with a curved surface to contact with the wear plate 13, the surface of the latter being preferably flat. In one practical application of my invention to a spring for a five-ton truck, and in which the spring was made up of fourteen plates $3/8''$ thick and $5''$ wide, the curvature of the upper surface of the hump, which contacts with the plate 13, was on a $5 3/8''$ radius. The hump was approximately $2 1/4''$ long and $3/8''$ high.

The line 21 indicates the plane of contact between the hump 16 and the plate 13. As the spring 12 deflects, under load, it tends to lengthen but I make the curvature of the hump 16 such, in relation to the contact surface of the plate 13, that the hump has a rolling action on the plate 13, as the spring deflects, so that throughout the normal range of deflection the hump contacts with the plate 13 at substantially the same point, thereby maintaining the effective length of the spring constant and likewise maintaining a constant rate of deflection. The lines 22, in Figs. 2 and 3, indicate the central plane of the hump 16, which contains the center of curvature of the hump, and from these figures, it will be seen that this plane has shifted, due to the lengthening of the spring. However, the point of contact between the hump 16 and the plate 13 remains substantially in the plane of the line 21, as will be best understood from Fig. 3. In the practical application of the invention to the spring above referred to, it was found that the point of contact did not shift more than $3/8''$ during the deflection from one-fourth load to full load and, for all practical purposes, this is considered as maintaining the point of contact at substantially the same position.

It has heretofore been customary to form the ends of the main plate 17 substantially the same as the ends of the adjoining auxiliary plate 18 but, according to my invention, I merely bend the plate 17, in a suitable press, to provide the hump 17, this additional operation being the only item of additional expense involved in practising my invention. It will, therefore, be seen that I have provided a spring having the desirable characteristic of a constant deflection rate without complications and without materially increasing the cost of manufacture.

Having thus described my invention, what I claim is:

1. In vehicles, the combination with a multiple-leaf spring comprising a main leaf and auxiliary leaves, the main leaf having a hump formed therein adjacent one end, said hump being directed away from the adjoining auxiliary leaf and the main leaf bearing upon said adjoining leaf at the ends of said hump, of a member supported by said spring having a surface engaging said hump and so related, in form, to the contour of said hump that the point thereon where said hump contacts remains substantially the same throughout the normal range of deflection of the spring.

2. In vehicles, the combination with a multiple-leaf spring comprising a main leaf and auxiliary leaves, the main leaf having a hump formed therein adjacent each end, said humps being directed away from the adjoining auxiliary leaf and the main leaf bearing upon said adjoining leaf at the ends of each of said humps, of a member supported by said spring having surfaces engaging said humps and so related, in form, to the contours of said humps that the distance between the points of contact between said surfaces and said humps remains substantially constant throughout the normal range of deflection of the spring.

In testimony whereof I affix my signature.

EDWARD H. LINDEMAN.